United States Patent [19]
Galipeault et al.

[11] Patent Number: 5,609,113
[45] Date of Patent: Mar. 11, 1997

[54] PARTICULATE WASTE WOOD FUEL, METHOD FOR MAKING PARTICULATE WASTE WOOD FUEL, AND A METHOD FOR PRODUCING ENERGY WITH PARTICULATE WASTE WOOD FUEL

[75] Inventors: Claude J. Galipeault; Lawrence E. Staab, both of Savannah, Ga.

[73] Assignee: Fiber Fuel International, Inc., Savannah, Ga.

[21] Appl. No.: 536,517

[22] Filed: Sep. 29, 1995

Related U.S. Application Data

[62] Division of Ser. No. 313,650, Sep. 27, 1994.

[51] Int. Cl.⁶ ................................... F23D 1/00
[52] U.S. Cl. ................ 110/347; 110/346; 110/341; 110/348; 126/58
[58] Field of Search ................ 126/58; 110/346, 110/347, 341

[56] References Cited

U.S. PATENT DOCUMENTS

| | | | |
|---|---|---|---|
| 3,064,592 | 11/1962 | Eberhardt | 110/7 |
| 3,252,435 | 5/1966 | Bogot et al. | 110/7 |
| 3,387,574 | 6/1968 | Mullen | 110/7 |
| 3,482,534 | 12/1969 | Whitman | 110/28 |
| 3,831,535 | 8/1974 | Baardson | 110/8 |
| 4,235,174 | 11/1980 | Spurrell | 110/346 |
| 4,532,873 | 8/1985 | Rivers et al. | 110/347 |
| 4,589,357 | 5/1986 | Lincoln et al. | 110/347 |

FOREIGN PATENT DOCUMENTS

| | | |
|---|---|---|
| WO87/00604 | 1/1987 | WIPO. |
| WO87/01179 | 2/1987 | WIPO. |

*Primary Examiner*—Larry Jones
*Attorney, Agent, or Firm*—Jones & Askew

[57] ABSTRACT

A particulate waste wood fuel comprising wood particles comprising less than 20% water by weight and having a particle size distribution suitable for combustion of the particulate wood fuel in a particulate fossil fuel suspension furnace. A method for making the particulate wood fuel includes shredding of waste wood and drying the shredded waste wood to obtain the desired particle size distribution and water content. A method for producing energy comprises injecting the particulate wood fuel into the combustion chamber of a particulate fuel suspension furnace separately from a particulate fossil fuel which is also injected into the combustion chamber. The particulate fossil fuel and particulate wood fuel are combusted in the combustion chamber in a gas flow through the combustion chamber to form a flame in the gas flow. The wood particles are substantially completely combusted within the combustion chamber while suspended in the gas flow and are not combusted at the furnace wall. The method of producing energy is particularly suited for tangentially-fired pulverized coal suspension furnaces such as are contained in some utility boilers.

22 Claims, 4 Drawing Sheets

PARTICULATE WASTE WOOD FUEL, METHOD FOR MAKING PARTICULATE WASTE WOOD FUEL, AND A METHOD FOR PRODUCING ENERGY WITH PARTICULATE WASTE WOOD FUEL

This is a division of application No. 08/313,650, filed Sep. 27, 1994.

TECHNICAL FIELD

This invention relates to the preparation and burning of particulate waste wood fuel to produce energy. More particularly, the present invention relates to a method for producing energy by combusting particulate wood fuel in the combustion chamber of a particulate fossil fuel suspension furnace.

BACKGROUND OF THE INVENTION

With increasing landfill costs and decreasing landfill availability, the cost of waste disposal has increased dramatically during recent years and is expected to increase further. This is a particularly serious problem for those, such as electric utility companies, who have large quantities of waste wood for disposal. Much of waste wood, however, has potential fuel value. If efficiently combusted, waste wood can provide dual benefits of alleviating landfill problems and producing needed energy. Waste wood is a relatively low cost fuel and, when efficiently combusted, emits relatively low levels of sulfur and ash.

Waste wood has long been burned in furnaces to produce energy. More efficient methods of converting waste wood to energy including comminuting waste wood to a reduced particle size having a maximum dimension from about one to four inches (2.5 to 10 cm) and burning the particulate wood fuel on grates in a boiler, in stoker furnaces, and in fluidized bed reactors. Such methods are effective to produce energy from waste wood but tend to be difficult to control because of variations in particle size, type, and quality of the wood being burned.

There exist a number of older, particulate fossil fuel suspension furnaces for boilers that produce electrical energy via the combustion of particulate fossil fuels such as pulverized coal and atomized oil. Natural gas may also be used in such furnaces in conjunction with the particulate fossil fuel. These suspension furnaces, which include tangentially-fired suspension furnaces and wall-fired suspension furnaces, are still used to some extent by utilities and manufacturing companies such as paper mills, but are relatively inefficient when compared to modem reactors that burn fossil fuels and other types of reactors such as nuclear reactors. Today, particulate fossil fuel suspension furnaces are typically used only in times of peak energy demand to supplement the primary electrical power system. Attempts have been made to more economically produce energy with suspension furnaces by burning wood in such furnaces along with fossil fuels, but those attempts have not been successful in burning wood at a high enough rate to economically produce energy. Because waste wood is inexpensive and available in large quantities, particulate fossil fuel furnaces could produce energy more economically if waste wood could be burned therein at a high enough rate. Thus, burning wood in particulate fossil fuel suspension boilers could increase the usefulness of such boilers and add to their value.

Prior attempts to burn wood in particulate fossil fuel suspension furnaces include co-firing waste wood particles with pulverized coal by mixing the waste wood particles with the coal at the coal pile and introducing the combined material into the furnace through the coal pulverizers which normally pulverize and then deliver pulverized coal to the furnace. This method can be used with combined fuels that contain less than about 10% by weight of wood particles, but such an amount of wood particles is ineffective to more economically produce energy with the furnace than by burning solely fossil fuels. When greater than about 10% by weight of particulate wood was mixed with the coal and fed to the pulverizer, the wood particles inhibited the pulverization of the coal such that the mixed fuel could not be efficiently combusted in the furnace.

Therefore, there is a need for a particulate waste wood fuel and a method for burning such fuel in a particulate fossil fuel suspension furnace to economically produce energy and increase the usefulness of such suspension furnaces and associated boilers.

SUMMARY OF THE INVENTION

The present invention fulfills the above-described need and encompasses a particulate wood fuel, a method for making that fuel, and a method for producing energy by combusting the particulate wood fuel. The particulate wood fuel of the present invention can be co-fired with particulate fossil fuel in a particulate fossil fuel suspension furnace to consistently produce energy in a relatively economical manner and with relatively low levels of sulfur and $NO_x$ emissions and low levels of ash. With the present invention, particulate wood can be burned along with particulate fossil fuel in a particulate fossil fuel suspension furnace in quantities up to an amount at which the particulate wood contributes about 50% of the total BTUs produced by the furnace. In addition, because the particulate wood fuel of the present invention has desirable flow characteristics and is introduced into the furnace separately from the particulate fossil fuel, such as pulverized coal, the relatively amount of particulate wood fuel combusted in the furnace can be tightly controlled. As will be explained further below, due to the nature of the particulate wood fuel of the present invention, particularly the particle size distribution of the particulate wood fuel, energy can be reliably and relatively economically produced by co-firing the particulate wood fuel and particulate fossil fuel in a particulate fossil fuel suspension furnace.

The particulate wood fuel of the present invention, comprises particles of wood and less than 20% water by weight. The particles of wood have a particle size distribution such that substantially 100% by weight of the wood particles will pass through a sieve having 9.5 mm diameter holes, up to 90% of the wood particles will pass through an eight mesh sieve, up to 55% of the wood particles will pass through a 16 mesh sieve, up to 30% of the wood particles will pass through a 30 mesh sieve, up to 15% of the wood particles will pass through a 50 mesh sieve, and up to 5% of the wood particles will pass through a 100 mesh sieve. Desirably, the particles size distribution of the wood particles is further characterized by having at least 45% by weight of the wood particles pass through a 16 mesh sieve.

The method of making the particulate wood fuel, according to the present invention, comprises shredding waste wood to form wood particles having the above-described particle size distribution. More particularly, the method of making the particulate wood fuel in accordance with the present invention comprises three shredding steps and two screening steps. In a first shredding step, waste wood is shredded in a horizontally forced fed, high speed rotating hammermill shredder to produce wood particles having a maximum dimension of about 10 cm. In a first screening step, the wood particles are screened to separate wood particles having a maximum dimension of less than about 2.5 cm from a first remaining portion of wood particles having a maximum dimension of at least about 2.5 cm. In the second shredding step, the first remaining portion of the wood particles is shredded in a second mill to reduce the first remaining portion of wood particles to wood particles having a maximum dimension of less than about 2.5 cm. In the second screening step, the wood particles having a maximum dimension of less than about 2.5 cm are screened to separate wood particles having a maximum dimension of less than about 6.4 mm from a second remaining portion having a maximum dimension of at least about 6.4 mm. In the third shredding step, the second remaining portion of wood particles is shredded in a third mill to reduce the second remaining portion of wood particles to wood particles having a maximum dimension less than about 6.4 mm. The third mill is desirably a grinder.

Desirably, the method of making the particulate wood fuel in accordance to the present invention includes separating non-wood products from the wood particles with an air separator and magnetically separating other ferrous metal particles from the shredded wood between the first shredding step and the first screening step. It is also desirable to dry the particles of wood to a moisture content of less than about 20% by weight of water. This may be done by diverting a portion of the wood particles having a maximum dimension of less than about 2.5 cm to a furnace to supply hot gas to a rotary drier. The diverted portion of wood particles is separated from a third remaining portion of wood particles having a maximum dimension of less than about 2.5 cm. The third remaining portion of wood particles is fed through the rotary drier for drying the wood particles.

Energy is produced in accordance with a method of the present invention by combusting the above-described particulate wood fuel in a particulate fossil fuel suspension furnace. An oxygen-containing gas, such as air, is introduced into a combustion chamber of a particulate fossil fuel suspension furnace to form a flow of gas through the combustion chamber. A particulate fossil fuel, such as pulverized coal or atomized oil, is injected into the combustion chamber through a first port in the furnace wall and into the gas flow. The particulate wood fuel is injected into the combustion chamber through a second port in the furnace wall and into the gas flow. The second port is separate from the first port such that the particulate wood is injected into the combustion chamber separately from the particulate fossil fuel. An existing coal port in the furnace may be used for injecting the wood particles. The particulate fossil fuel and the particulate wood fuel are combusted in the gas flow to form a flame in the gas flow. The particulate wood fuel has a reduced water content and a particle size distribution such that the wood particles are substantially completely combusted within the combustion chamber while suspended in the gas flow and are not combusted at the furnace wall. Because the particulate wood fuel passes through a sieve having 9.5 mm diameter holes, the particles of wood are of such a size that, when injected into the vortex of the gas flow, the particles are substantially completely combusted within the combustion chamber of the furnace while suspended in the gas flow. Furthermore, because the particulate wood fuel comprises no more than a limited amount of finer wood particles, the wood particles are combusted in the gas flow and not at the furnace wall. If the particulate wood fuel had a larger amount of the finer particles, the particles would combust immediately upon entering the combustion chamber at the furnace wall, overheat the furnace wall at the ports, create hot spots on the furnace wall, and thereby damage the furnace wall.

Accordingly, an object of the present invention is to provide an improved particulate waste wood fuel.

Another object of the present invention is to provide an improved method for making particulate waste wood fuel.

Still another object of the present invention is provide a method for producing energy with particulate waste wood fuel.

Yet another object of the present invention is to provide a method for more economically producing energy with particulate fossil fuel suspension furnace boilers by co-firing particulate fossil fuel and particulate waste wood fuel in the furnace.

Other objects, features, and advantages of the present invention will become apparent from the following detail description, claims and drawings.

DETAILED DESCRIPTION OF DRAWINGS

Figure 1A:
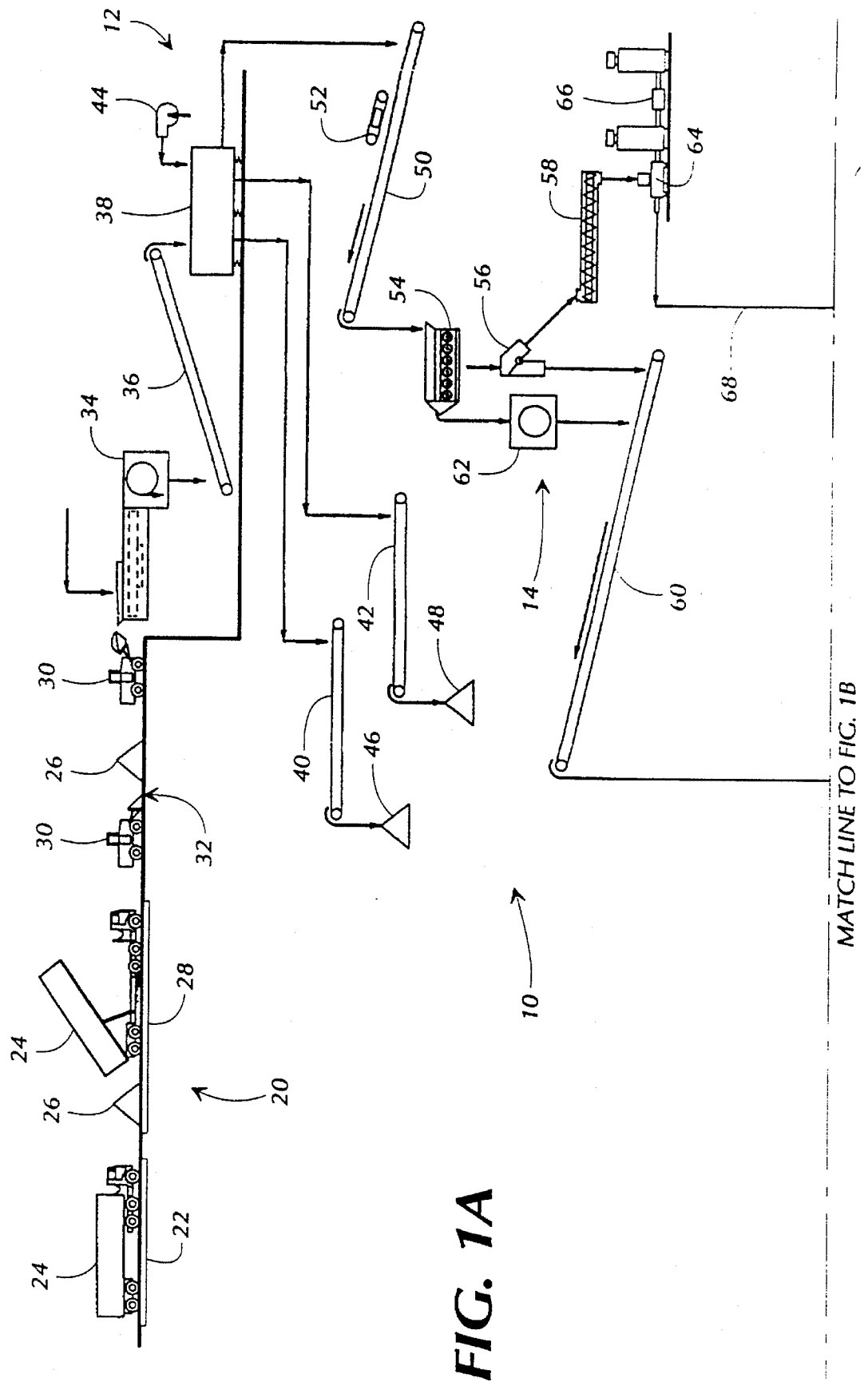
FIGS. 1A and 1B (which are to be joined along the matchline) are schematic diagrams of a system for making particulate waste wood fuel in accordance with an embodiment of the present invention.

As summarized above, the present invention encompasses a particulate waste wood fuel, a method for making that fuel, and method for producing energy by burning that fuel with a particulate fossil fuel in a particulate fossil fuel suspension furnace such as a tangentially-fired or wall-fired suspension furnace. Below, the particulate waste wood fuel is described first, followed by a detailed description of embodiments of the method of making the particulate waste wood fuel and the method for producing energy by burning the waste wood fuel.

The particulate waste wood fuel of the present invention is designed to be combusted in a particulate fossil fuel suspension furnace boiler. Clean waste wood is any burnable tree-derived waste and includes, for example, logging waste, land clearing debris, right of way trimmings, construction debris, donnage, wood pallets, and the like. As summarized above, there is a need for disposing of large quantities of waste wood, but landfill costs have increased substantially and continue to increase such that alternative methods of disposal are desirable. In addition, there are a number of older particulate fossil fuel suspension furnace boilers that are in existence and in good operating condition, but are rarely used because such boilers are relatively inefficient in comparison to modem energy production facilities and may not meet clean air regulations. The present invention solves both of these problems by providing a particulate wood fuel made form waste wood.

According to the present invention, waste wood is comminuted to a reduced particle size to decrease the time required to combust the wood. Desirably, the waste wood particles have a particle size small enough so that the wood particles are substantially completely combusted in the vortex of a gas flow through a tangentially-fired suspension furnace combustion chamber. However, the particulate wood fuel can only comprise a limited number of very fine wood particles because the fine wood particles combust too quickly. The fine wood particles combust immediately upon entering the combustion chamber of the furnace and combust at or near the furnace wall and create hot spots in the furnace wall which can damage the furnace wall, such as by bursting boiler tubes.

The particulate waste wood fuel also desirably has a particle size distribution such that the particulate wood fuel is flowable. The particulate wood fuel of the present invention has flow properties such that the wood fuel can be conveyed in conventional systems for delivery and injection into the furnace. The wood fuel of the present invention can be conveyed and metered by augers so that the amount of fuel conveyed is accurately controllable. In addition, the wood fuel of the present invention is pneumatically conveyed and injected into a furnace. If the wood particles are too large, the wood particles are difficult to meter consistently and difficult to pneumatically convey. If the wood particles are too small, such as with a powder, the particles tend to agglomerate and cake and cannot be consistently conveyed and metered using augers and pneumatic systems. The particulate wood fuel of the present invention has a more coarse particle size distribution than a powder such that the particulate wood fuel of the present invention can be poured like a granular material such as table salt.

More particularly, the particle size distribution of the particulate wood fuel of the present invention is such that substantially 100% by weight of wood particles will pass through a sieve having 9.5 mm diameter holes, up to 90% of the wood particles will pass through an 8 mesh sieve, up to 55% of the wood particles will pass through a 16 mesh sieve, up to 30% of the wood particles will pass through a 30 mesh sieve, up to 15% of the wood particles will pass through 50 mesh sieve, and up to 5% of the wood particles will pass through a 100 mesh sieve. Table 1 below contains data on the particle size distribution of an actual particulate waste wood fuel sample made according to the method which will be described in detail below. Table 1 shows the quantities of wood particles passing through and retained by various sieves. The amounts passing and retained are shown in percent by weight of the total fuel sample. The sieve sizes are provided along with the sizes of the openings in the respective sieves. Sizes are shown in both metric and English units.

TABLE 1

| Sieve Size | Fuel Sample | | Opening Size | |
|---|---|---|---|---|
| | % Passing | % Retained | MM | In. |
| 3/8" hole | 100. | 0.0 | 9.5 | 0.375 |
| #4 mesh | 99.2 | 0.8 | 4.75 | 0.197 |
| #8 mesh | 87.0 | 13.0 | 2.36 | 0.0937 |
| #16 mesh | 50.1 | 49.9 | 1.18 | 0.0469 |
| #30 mesh | 26.5 | 73.5 | 0.60 | 0.0234 |

TABLE 1-continued

| Sieve Size | Fuel Sample | | Opening Size | |
|---|---|---|---|---|
| | % Passing | % Retained | MM | In. |
| #50 mesh | 12.9 | 87.1 | 0.30 | 0.0117 |
| #100 mesh | 5.2 | 94.8 | 0.15 | 0.0059 |
| #200 mesh | 1.8 | 98.2 | 0.075 | 0.0029 |

The particulate waste wood fuel of the present invention comprises less than 20% water by weight so that the particulate wood fuel can be quickly combusted and can be burned to produce a relatively hot flame. Larger quantities of water increase the time required to combust the particulate wood fuel and produces additional gas which reduces the heat generated by combustion.

Figure 1B:
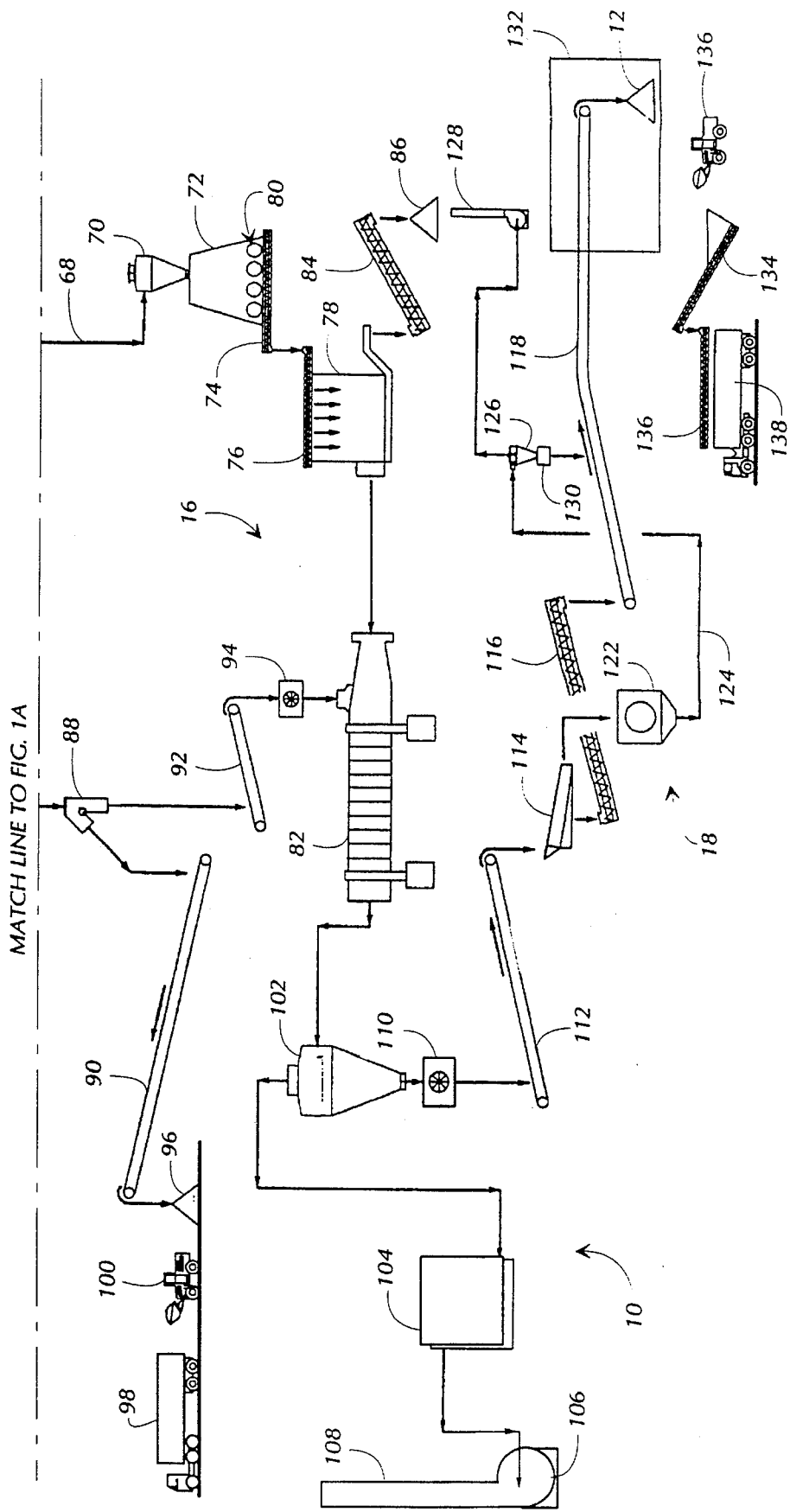

Turning to FIG. 1, a schematic diagram of a method for comminuting and drying waste wood according to the embodiment of the present invention is illustrated. Generally described, the waste wood shredding system 10 includes a primary shredding and separating station 12 for reducing the waste wood to particles having a maximum dimension of about 10 cm, a secondary shredding and separating station 14 for reducing the waste wood particles to particles having a maximum dimension less than about 2.5 cm, a drying station 16 for reducing the water content of the wood particles from the secondary shredding and separating station and a final shredding and separating station 18 for reducing the particle size of the wood particles to a maximum dimension less than about 6.4 mm. After passing through the final shredding and separating station 18 the particulate waste wood fuel has the particle size distribution described above.

More particularly, the waste wood shredding system 10 includes a waste wood delivery and storage station 20 for receiving incoming raw waste wood. The delivery and storage station 20 includes a scale 22 for weighing trucks 24 delivering raw waste wood. The raw waste wood 26 is unloaded from the truck 24 on a tipping slab 28 and then transported by mobile loaders 30 from the tipping slab to a storage area 32 and then to a primary shredder 34 positioned at the primary shredding and separating station 12.

The primary shredder 34 is a horizontally fed, high-speed rotating hammermill with a receiving hopper. Such a shredder 34 is well-known to those skilled in the art and is not described here in detail. Generally described, the receiving hopper of the primary shredder 34 has a hydraulic ram positive feed system which pushes the raw waste wood 26 into a cutting zone of the hammermill shredder 34. The primary shredder 34 is commonly known as a "hog" shredder and comprises a set of rotating, sheering hammer blades and a sieve. The waste wood is repeatedly shredded by the rotor blades until the waste wood is reduced to particles that pass through the sieve. The primary shredder 34 shreds the waste wood 26 until the waste wood has a particle size with a maximum dimension less than about 10 cm and generally from about 7.5 to about 10 cm.

Waste wood particles from the primary shredder 34 are deposited from the primary shredder onto a shredder discharge conveyor 36 and conveyed to a vibrating air separator 38 for separating more dense material such as dirt, tramp metals, and stones from the wood particles. The vibrating air separator 38 is known as a destoner and is available from General-Kinematics of Barrington, Ill. The shredded waste wood travels across a vibrating screen of the vibrating air separator 38 and the denser material such as the dirt, metals, and stones fall through openings in the screen to respective conveyors 40 and 42 while the wood particles are maintained above the screen by air supplied from a fan 44. The separated dirt, metals, and stones are transported by the conveyors 40 and 42 to respective storage piles 46 and 48 and are eventually disposed.

Separated wood particles are deposited from the vibrating air separator 38 onto a transfer conveyor 50. As the wood particles are transported on the transfer conveyor 50, a magnet 52 is used to separate remaining ferrous metal particles from the wood particles. The transfer conveyor 50 then deposits the wood particles onto a scalping screen 54 that separates wood particles having a maximum dimension less than about 2.5 cm from a first remaining portion having a maximum dimension of at least 2.5 cm. The wood particles having a maximum dimension less than about 2.5 cm are deposited from the scalping screen 54 through a by-pass chute 56 so that wood particles having a maximum dimension less than 2.5 cm can be directed to either a burner fuel screw conveyor 58 for use as fuel in the drying station 16 or directly to a transfer conveyor 60 which leads towards the final shredding and separating station 18. The first remaining portion of wood particles from the scalping screen 54 is deposited into a secondary shredder 62 that reduces the first remaining portion of wood particles to wood particles having a maximum dimension less than about 2.5 cm. The secondary shredder 62 is also a rotating hammermill or hog, the structure of which is well-know to those skilled in the art, but can also be another type of mill, such as a grinder, provided that the mill is capable of controlling wood particle size, such as is done with a sieve. Wood particles shredded in the secondary shredder 62 are deposited to the transfer conveyor 60 for eventual delivery into the final shredding and separating station 18.

Wood particles deposited onto the burner fuel screw conveyor 58 of the drying station 16 are deposited from the conveyor to a pneumatic feeder 64. A blower forces the wood particles from the feeder 64 through a pneumatic line 68 to a burner fuel cyclone 70 and fuel bin 72. The particulate wood fuel in the burner fuel bin 72 is transported by a burner fuel bin discharge screw conveyor 74 to a fuel distribution screw conveyor 76 from which the particulate wood fuel is deposited into a furnace 78. The particulate wood fuel transported from the burner fuel bin 72 is metered by a burner fuel bin rotary discharge system 80. The dryer furnace is desirably a McConnell-Waterwide Burner available from McConnell Industries, Inc. of Trussville, Ala. Hot gas produced by the furnace 78 is supplied to rotary dryer 82 for drying the wood particles not used as fuel in the dryer furnace 78. Ash produced by the dryer furnace 78 is transported from the furnace via an ash transfer screw conveyor 84 to a storage pile 86 for eventual disposal.

The rotary drier 82 is a single pass rotating drum dryer. Wood particles having a maximum dimension less than about 2.5 cm are deposited from the transfer conveyor 60 through a by-pass chute 88. From the by-pass chute 88, the wood particles can be directed to a fuel stack-out conveyor 90 for eventual use as particulate wood fuel or can be deposited to a dryer feed conveyor 92 for delivery to the rotary dryer 82 through a rotary discharge feeder 94. The wood particles directed to the rotary dryer are dried until the wood particles have a moisture content of less than 20% by weight of the wood particles.

The wood particles directed to the stack-out conveyor 90 are conveyed to a wood storage pile 96 and can be transferred from that pile to a transportation truck 98 with a mobile loader 100. The particulate wood fuel in the pile 96 is undried and does not have the appropriate particle size distribution for use in the method for producing energy according to the present invention, but is a useful fuel in more conventional systems.

The dried wood particles from the rotary dryer 82 are transferred to a primary collector 102 which separates the hot gas discharged by the dryer from the dried wood particles. The hot gas is discharged from the primary collector 102 to a secondary collector 104 to remove fine wood particles and is then drawn from the secondary collector by a fan 106 and exhausted through an exhaust stack 108.

Dried wood particles are deposited through the bottom of the primary collector 102 through a rotary discharge feeder 110 to a transfer conveyor 112 which transports the dry wood particles to a vibrating screen 114 in the final shredding and separating station 18. The vibrating screen 114 screens the dried wood particles having a maximum dimension less than about 2.5 cm and separates wood particles having a maximum dimension less than about 6.4 mm from a second remaining portion having a maximum dimension of at least about 6.4 mm. The wood particles having a maximum dimension less than about 6.4 mm are deposited front the vibrating screen 114 onto a transfer conveyor 116 which transports the wood particles to another transfer conveyor 118 for delivery to a storage pile 120.

The second remaining portion of wood particles having a maximum dimension of at least about 6.4 mm are deposited from the vibrating screen 140 to a third shredder 122 for reducing those wood particles to wood particles having a maximum dimension less than about 6.4 mm. The third shredder 122 is a grinder and, as known to those skilled in the art, has a grinding wheel or drum for comminuting the wood to a particular particle size. The wood particles front the third shredder 122 have a particle size less than about 6.4 mm and are transported through a pneumatic line 124 to a cyclone 126 in which the wood particles are separated from the air used transport the wood particles through the pneumatic line. The air is directed front the cyclone 126 to an exhaust stack 128 for discharge to the atmosphere and the wood particles are deposited through a rotary air lock 130 onto the transfer conveyor 118 for delivery to the storage pile 120. The storage pile 120 is desirably stored in an enclosure 130 to protect the dry wood particles from moisture.

The dried wood particles in the storage pile 120 can be conveyed to a reclaim conveyor 134 via a mobile loader 136. The dry wood particles are transported by the reclaim conveyor 134 to a load leveling screw conveyor 136 which distributes the wood particles in an appropriate transportation vehicle such as a truck 138.

Figure 2:
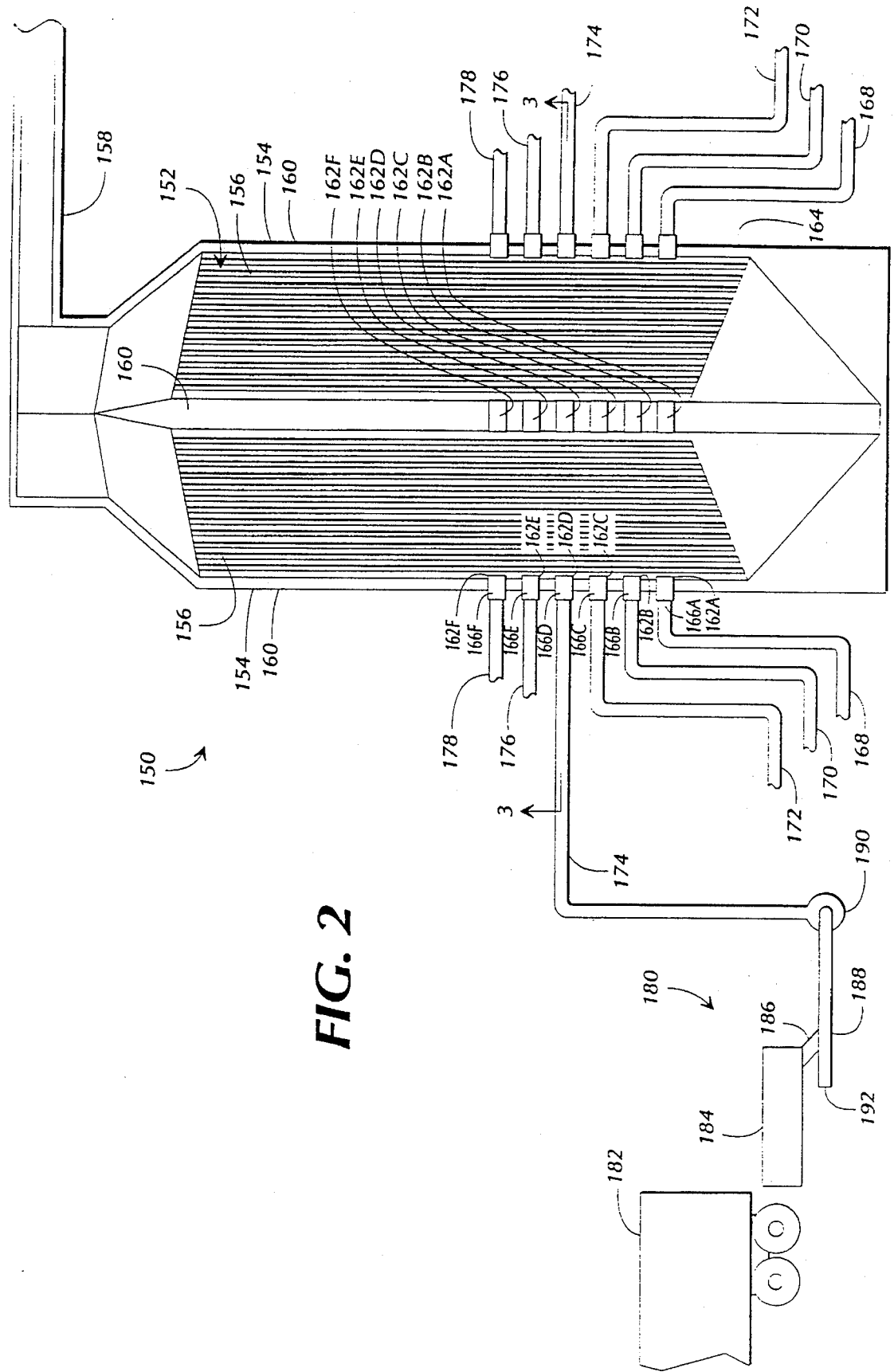
FIG. 2 is a schematic diagram of a system for co-firing particulate fossil fuel and particulate waste wood fuel in a tangentially-fired pulverized coal suspension furnace boiler in accordance with an embodiment of the present invention.
Figure 3:
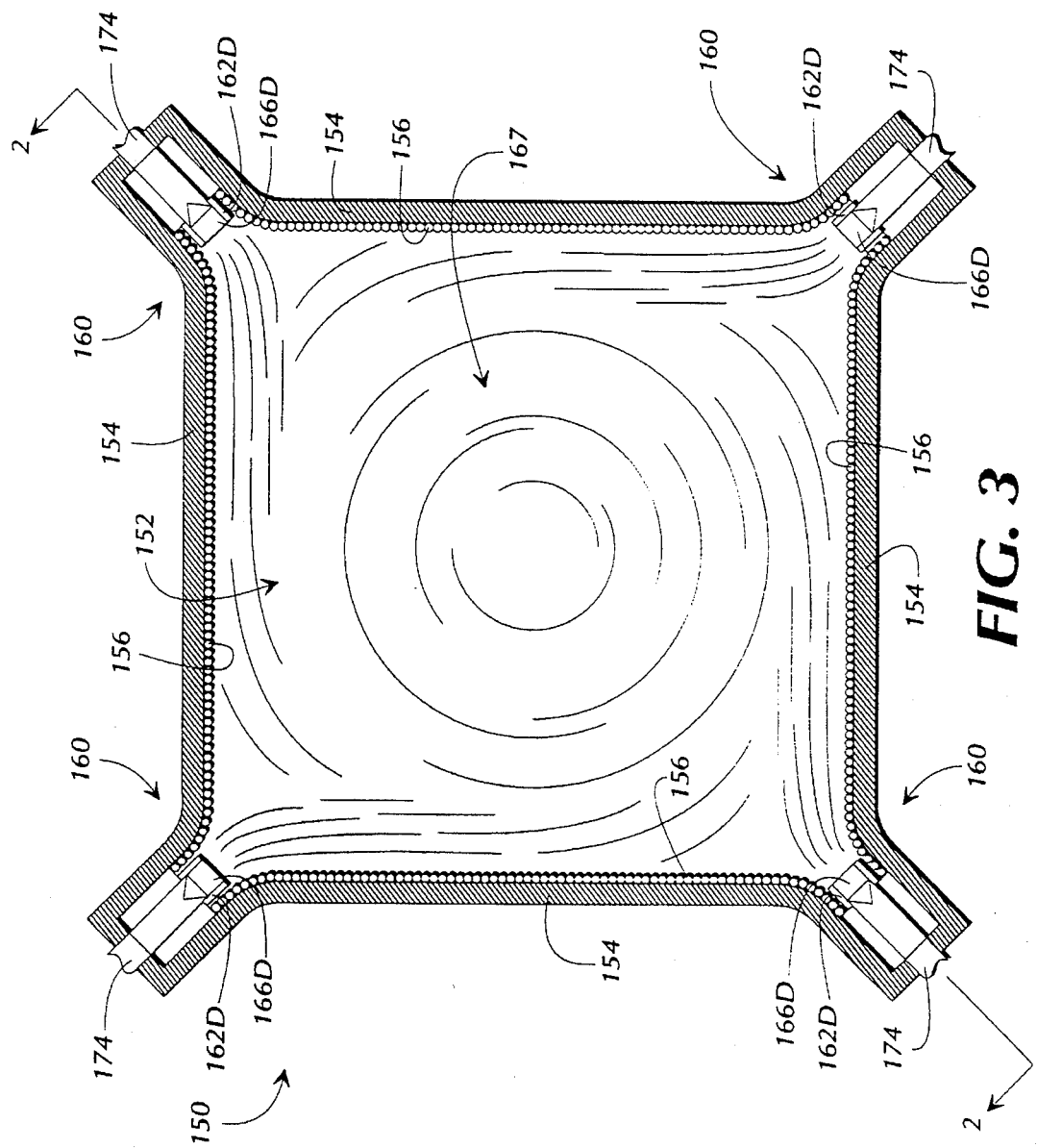
FIG. 3 is a cross-sectional plan view of a tangentially-fired suspension furnace boiler for use in accordance with an embodiment of the present invention.

A tangentially-fired particulate fossil fuel suspension furnace boiler 150 is shown in FIGS. 2 and 3. According to an embodiment of the present invention, the above-described particulate wood fuel of the present invention can be consistently and efficiently co-fired along with particulate fossil fuel, such as pulverized coal or atomized oil, in a furnace of the type shown in FIGS. 2 and 3. It should be understood, however, that the particulate wood fuel of the present invention can also be co-fired with particulate fossil fuel in a wall-fired suspension furnace boiler.

The boiler 150 shown in FIGS. 2 and 3 comprises a combustion chamber 150 defined by a furnace wall 154. The furnace wall 154 is lined with vertically extending boiler tubes which hold water for the production of steam which is used to produce electrical energy. A gas exhaust conduit 158 extends form the top of the boiler and leads to a stack (not shown) for release of the gas to the atmosphere.

As best shown in FIG. 3, the combustion chamber 152 has a substantially square cross-section defined by the furnace wall 154. The square combustion chamber 152 has corner regions 160 through which injection ports extend. Six injection ports 162A–F extend through the furnace wall 154 at each of the corner regions 160 and are positioned parallel to one another along with length of the combustion chamber 152 at the lower portion 164 of the combustion chamber.

Tilting nozzles 166A–F are disposed in the injection ports 162 for injecting the desired materials into the combustion chamber 152. The tilting nozzles 166A–F can be manipulated to direct the material being injected through the tilting nozzles. In the tangentially-fired furnace 150, the tilting nozzles 166A–F are typically directed tangentially with respect to the furnace wall 154 so as to create a gas flow through the combustion chamber 152 having a vortex.

Each of the tilting nozzles 166A–F is connected to a respective conduit. In the arrangement shown in FIG. 2, the most upstream tilting nozzle 166A is connected to a conduit for carrying pressurized air 168. The second tilting nozzle 166B is positioned immediately downstream of the first tilting nozzle 166A and is connected to a pulverized coal conduit 170. The third tilting nozzle 166C is positioned immediately downstream of the second tilting nozzle 166B and is connected to an oil conduit 172. The fourth titling nozzle 166D is positioned immediately downstream of the third tilting nozzle 166C and is connected to a particulate wood fuel conduit 174. The fifth titling nozzle 166E is positioned immediately downstream of the fourth titling nozzle 166D and is connected to a natural gas conduit 176. The sixth titling nozzle 166F is positioned immediately downstream of the fifth titling nozzle 166E and is connected to another air conduit 178. It should be understood that the relative positions of the conduits 168, 170, 172, 174, 176, and 178 can be interchanged. For example, the particulate wood fuel conduit 174 can be positioned upstream of the pulverized coal conduit 170.

The particulate wood fuel and the pulverized coal are introduced pneumatically into the combustion chamber 152 through respective conduits 174 and 170. The system 180 for transporting the particulate wood fuel to and through the particulate wood fuel conduit 174 is illustrated in FIG. 2. Particulate wood fuel may be delivered to the boiler site by means such as a truck 182 and deposited in a metering auger 184 for delivering a controlled amount of the particulate wood fuel to the furnace 150. The particulate wood fuel is deposited from the auger 180 through a chute 186 into a pneumatic line 188. A fan 190 in the pneumatic line draws air through an opening 192 and pneumatically conveys the particulate wood fuel through the pneumatic line 188 and through the particulate wood fuel conduit 174 to the respective titling nozzle 166B.

To produce energy with the furnace boiler 150 shown in FIGS. 2 and 3, an oxygen-containing gas, such as air, is introduced through the air conduits 168 and 178 tangentially into the combustion chamber 152 of the furnace through the respective titling nozzles 166A and F to form a flow of gas through the combustion chamber having a vortex. The pulverized coal is injected pneumatically and tangentially into the combustion chamber 152 through the coal conduit 170 and the respective tilting nozzle 166B and into the vortex of the gas flow. At the same time, the particulate wood fuel is injected tangentially and pneumatically into the combustion chamber 152 through the respective particulate wood fuel conduit 174 (an existing coal conduit can be diverted for this use) and respective titling nozzle 166D and into the vortex of the gas flow. The pulverized coal and the particulate wood fuel are not mixed with one another prior to being introduced into the combustion chamber 152. This allows for independent control of the amount of particulate wood fuel injected into the furnace boiler 152 and allows variation in the relative amounts of coal and wood fuel injected into the combustion chamber. The pulverized coal and particulate wood fuel are combusted in the vortex of the gas flow to form a flame in vortex of the gas flow. Radiant heat from this flame heats the boiler tubes 165 lining the furnace wall 154 and the water inside those tubes to produce steam, and from the stream, electrical energy. As explained above, the moisture content and particle size distribution of the particulate wood fuel is such that the wood particles are substantially completely combusted within the combustion chamber 152 while the particulate wood fuel is suspended in the vortex of the gas flow. The particulate wood fuel is not combusted at the furnace wall so as to avoid the creation of hot spots at the furnace wall 154 which could cause the boiler 156 to burst.

Natural gas can be injected into the combustion chamber 152 of the furnace 150 through the natural gas conduit 176 and the respective titling nozzle 166E during combustion of the coal and the particulate wood. This is particularly helpful when the rate of particulate wood fuel is relatively high. Using the method of the present invention for producing energy, particulate wood fuel can be co-fired with particulate fossil fuel such as pulverized coal in amounts such that the particulate wood fuel contributes 15–50% of the energy produced by the furnace by BTU.

The following example is designed to disclose embodiments of the present invention and teach one skilled in the art to practice the present invention.

EXAMPLE 1

Particulate wood fuel having a moisture content less than 20% by weight and the particle size distribution set forth in Table 1 was co-fired with pulverized coal in a 54 megawatt tangentially-fired pulverized coal boiler. The boiler had the general configuration illustrated in FIGS. 2 and 3 and described above. Specifically, the boiler is the unit 2 boiler at the Savannah Electric & Power Company Plant Kraft in Savannah, Ga. Eleven runs were conducted varying combinations of the particulate wood fuel, pulverized coal, and natural gas. Each run was conducted for more than one hour. The relative amounts of particulate wood fuel, pulverized coal, and natural gas injected into the furnace of each of the eleven runs and the resulting megawattage(MW) are set forth in Table 2 below. The relative amounts of particulate wood fuel, pulverized coal, and natural gas are shown as percentages of BTUs contributed.

In the eleven runs, co-firing levels of up to 41% particulate wood by heating value were achieved at reduced load and zero natural gas. Full load was achieved with 35% particulate wood co-firing by heat input and about 18% natural gas input.

With natural gas co-firing, the use of the particulate wood did not appear to cause opacity degradation. Opacity degradation indicates increased levels of pollutant emissions. At zero gas co-firing, opacity appeared higher than with gas co-firing, but all opacity measurements were within legal limits. $NO_x$ levels were low during all runs with natural gas co-firing. Overall, boiler efficiency was somewhat lower with particulate wood co-firing, but overall boiler efficiency was comparable to that achieved with 100% pulverized coal firing. With gas co-firing, boiler efficiency was reduced from a baseline condition (nominally 50% coal 50% gas, zero particulate wood) by 0–1.6 boiler efficiency percentage points. Without gas co-firing, boiler efficiency was reduced between 1.5 to 4 efficiency percentage points.

TABLE 2

| Test # | % Coal | % Gas | % Wood | Load (MW) |
|---|---|---|---|---|
| 1 | 58 | 42 | 0 | 49 |
| 2 | 60 | 31 | 9 | 47 |
| 3 | 59 | 19 | 22 | 47 |
| 4 | 57 | 16 | 27 | 47 |
| 5 | 66 | 0 | 34 | 36 |
| 6 | 59 | 0 | 41 | 27 |
| 7 | 52 | 48 | 0 | 52 |
| 8 | 49 | 28 | 23 | 52 |
| 9 | 48 | 24 | 28 | 52 |
| 10 | 47 | 18 | 35 | 53 |
| 11 | 59 | 0 | 41 | 41 |

It should be understood that the foregoing relates to particular embodiments of the present invention and that numerous changes can be made therein without departing from the scope of the invention as defined by the following claims.

We claim:

1. Method for producing energy comprising the steps of:
introducing an oxygen containing gas into a combustion chamber of a particulate fossil fuel suspension furnace to form a flow of gas through the combustion chamber, the combustion chamber being defined by a furnace wall;
injecting a particulate fossil fuel into the combustion chamber through a first port in the furnace wall and into the gas flow;
injecting a particulate wood fuel into the combustion chamber through a second port in the furnace wall and into the gas flow, the second port being separate from the first port such that the particulate wood is injected into the combustion chamber separately from the particulate fossil fuel; and
combusting the particulate fossil fuel and the particulate wood fuel in the gas flow to form a flame in the gas flow,
the particulate wood fuel comprising less than 20% water by weight and having a particle size distribution such that substantially 100% by weight of the wood particles will pass through a sieve having 9.5 mm diameter holes, up to 90% of the wood particles will pass through an 8 mesh sieve, up to 55% of the wood particles will pass through a 16 mesh sieve, at least 45% by weight of the wood particles pass through a 16 mesh sieve, up to 30% of the wood particles will pass through a 30 mesh sieve, up to 15% of the wood particles will pass through a 50 mesh sieve, and up to 5% of the wood particles will pass through a 100 mesh sieve, so that the wood particles are substantially completely combusted within the combustion chamber while suspended in the gas flow and are not combusted at the furnace wall.

2. Method as in claim 1 wherein:
the furnace is a tangentially-fired particulate fossil fuel suspension furnace;
the oxygen-containing gas is introduced tangentially into the combustion chamber so that the gas flow through the furnace has a vortex;
the particulate fossil fuel is introduced tangentially into the combustion chamber and into the vortex of the gas flow;
the particulate wood fuel is introduced tangentially into the combustion chamber and into the vortex of the gas flow; and
the particulate fossil fuel and the wood particles are substantially completely combusted within the combustion chamber while suspended in the vortex of the gas flow.

3. Method as in claim 2 wherein the furnace is a tangentially-fired pulverized coal suspension furnace and the particulate fossil fuel is pulverized coal.

4. Method as in claim 2 further comprising the steps of tangentially injecting natural gas into the combustion chamber through a third port in the furnace and into the vortex of the gas flow, and combusting the natural gas in the vortex of the gas flow.

5. Method as in claim 1 wherein the furnace is a wall-fired particulate fossil fuel suspension furnace.

6. Method as in claim 5 wherein the furnace is a wall-fired pulverized coal suspension furnace and the particulate fossil fuel is pulverized coal.

7. Method as in claim 1 wherein the furnace is a pulverized coal suspension furnace and the particulate fossil fuel is pulverized coal.

8. Method as in claim 1 wherein the particulate fossil fuel is atomized oil.

9. Method as in claim 1 wherein the furnace forms part of a boiler and the furnace wall includes boiler tubes.

10. Method as in claim 9 wherein the boiler is a utility grade boiler.

11. Method as in claim 1 further comprising the steps of injecting natural gas into the combustion chamber through a third port in the furnace and into the gas flow, and combusting the natural gas in the gas flow.

12. Method as in claim 11 wherein the first port is upstream of the third port and the second port is between the first port and the third port.

13. Method as in claim 11 wherein the second port is upstream of the third port and the first port is between the second port and the third port.

14. Method as in claim 1 wherein the first port is upstream of the second port.

15. Method as in claim 1 wherein the second port is upstream of the first port.

16. Method as in claim 1 further comprising the step of pneumatically conveying the particulate wood fuel through a conduit to the second port.

17. Method as in claim 16 further comprising the step of conveying the particulate wood fuel to the conduit with an auger.

18. Method as in claim 1 wherein the particulate wood fuel is injected in an amount such that the particulate wood fuel contributes from about 15 to about 50% of the energy produced by the furnace.

19. Method for producing energy comprising the steps of:
introducing an oxygen containing gas into a combustion chamber of a particulate fossil fuel suspension furnace to form a flow of gas through the combustion chamber, the combustion chamber being defined by a furnace wall;
injecting a particulate fossil fuel into the combustion chamber through a first set of ports in the furnace wall and into the gas flow, the first set of ports being spaced about the combustion chamber;

injecting a particulate wood fuel into the combustion chamber through a set of second ports in the furnace wall and into the gas flow, the second set of ports being separate from the first set of ports such that the particulate wood is injected into the combustion chamber separately from the particulate fossil fuel, the second set of ports also being spaced about the combustion chamber; and combusting the particulate fossil fuel and the particulate wood fuel in the gas flow to form a flame in the gas flow, the particulate wood fuel comprising less than 20% water by weight and having a particle size distribution such that substantially 100% by weight of the wood particles will pass through a sieve having 9.5 mm diameter holes, up to 90% of the wood particles will pass through an 8 mesh sieve, up to 55% of the wood particles will pass through a 16 mesh sieve, at least 45% by weight of the wood particles pass through a 16 mesh sieve, up to 30% of the wood particles will pass through a 30 mesh sieve, up to 15% of the wood particles will pass through a 50 mesh sieve, and up to 5% of the wood particles will pass through a 100 mesh sieve, so that the wood particles are substantially completely combusted within the combustion chamber while suspended in the gas flow and are not combusted at the furnace wall.

20. Method as in claim 19 wherein:

the furnace is a tangentially-fired particulate fossil fuel suspension furnace;

the oxygen-containing gas is introduced tangentially into the combustion chamber so that the gas flow through the furnace has a vortex;

the particulate fossil fuel is introduced tangentially into the combustion chamber and into the vortex of the gas flow:

the particulate wood fuel is introduced tangentially into the combustion chamber and into the vortex of the gas flow; and the particulate fossil fuel and the wood particles are substantially completely combusted within the combustion chamber while suspended in the vortex of the gas flow.

21. Method as in claim 19 wherein the furnace is a wall-fired particulate fossil fuel suspension furnace.

22. Method as in claim 19 wherein the combustion chamber has a substantially square cross-section defined by the furnace wall and having corner regions, the ports of the first and second sets of ports being positioned at respective corner regions of the combustion chamber cross-section.

* * * * *